United States Patent

Winner et al.

[11] Patent Number: 6,114,973
[45] Date of Patent: Sep. 5, 2000

[54] METHOD AND APPARATUS FOR RECOGNIZING WHETHER TRAFFIC DRIVES ON THE RIGHT OR ON THE LEFT

[75] Inventors: Hermann Winner, Karlsruhe; Stefan Witte, Minden; Alain Gaillard, Karlsruhe, all of Germany

[73] Assignee: Robert Bosch GmbH, Stuttgart, Germany

[21] Appl. No.: 08/928,687

[22] Filed: Sep. 12, 1997

[30] Foreign Application Priority Data

Sep. 12, 1996 [DE] Germany ............... 196 37 053

[51] Int. Cl.⁷ ........................................... G08G 1/09
[52] U.S. Cl. ................... 340/905; 340/903; 340/904; 340/435; 340/436; 342/70; 367/909; 180/169
[58] Field of Search ...................... 340/905, 903, 340/904, 436, 435; 342/70, 71, 72; 367/909; 180/169, 167, 168, 170

[56] References Cited

U.S. PATENT DOCUMENTS

| | | | |
|---|---|---|---|
| 3,126,522 | 3/1964 | Fieser | 340/935 |
| 5,266,954 | 11/1993 | Orlowski et al. | 342/69 |
| 5,400,864 | 3/1995 | Winner et al. | 180/169 |
| 5,670,935 | 9/1997 | Schofield et al. | 340/461 |
| 5,726,647 | 3/1998 | Waffler et al. | 340/903 |
| 5,771,007 | 6/1998 | Arai et al. | 340/903 |
| 5,841,366 | 11/1998 | Yamamoto et al. | 340/901 |
| 5,884,212 | 3/1999 | Lion | 701/117 |
| 5,935,190 | 8/1999 | Davis et al. | 701/119 |

FOREIGN PATENT DOCUMENTS

| | | | |
|---|---|---|---|
| 0716949 | 6/1996 | European Pat. Off. | B60K 31/00 |
| 4200694 | 7/1993 | Germany | B60K 31/00 |

*Primary Examiner*—Nina Tong
*Attorney, Agent, or Firm*—Fulbright & Jaworski, LLP

[57] ABSTRACT

A method and an apparatus based thereon are described for the automatic recognition of whether, in a traffic situation or in a traffic environment, vehicles are driving on the right or on the left. Said method is used in a motor vehicle as part of adaptive speed control. The prevailing direction of traffic flow is determined on the basis of other vehicles, which are traveling toward the cited vehicle. For this purpose, a frequency distribution is created as a function of a lateral, preferably directional distance y; a center of gravity S of this frequency is determined; and then it is determined on what side of the controlled vehicle this center of gravity S is located.

13 Claims, 3 Drawing Sheets

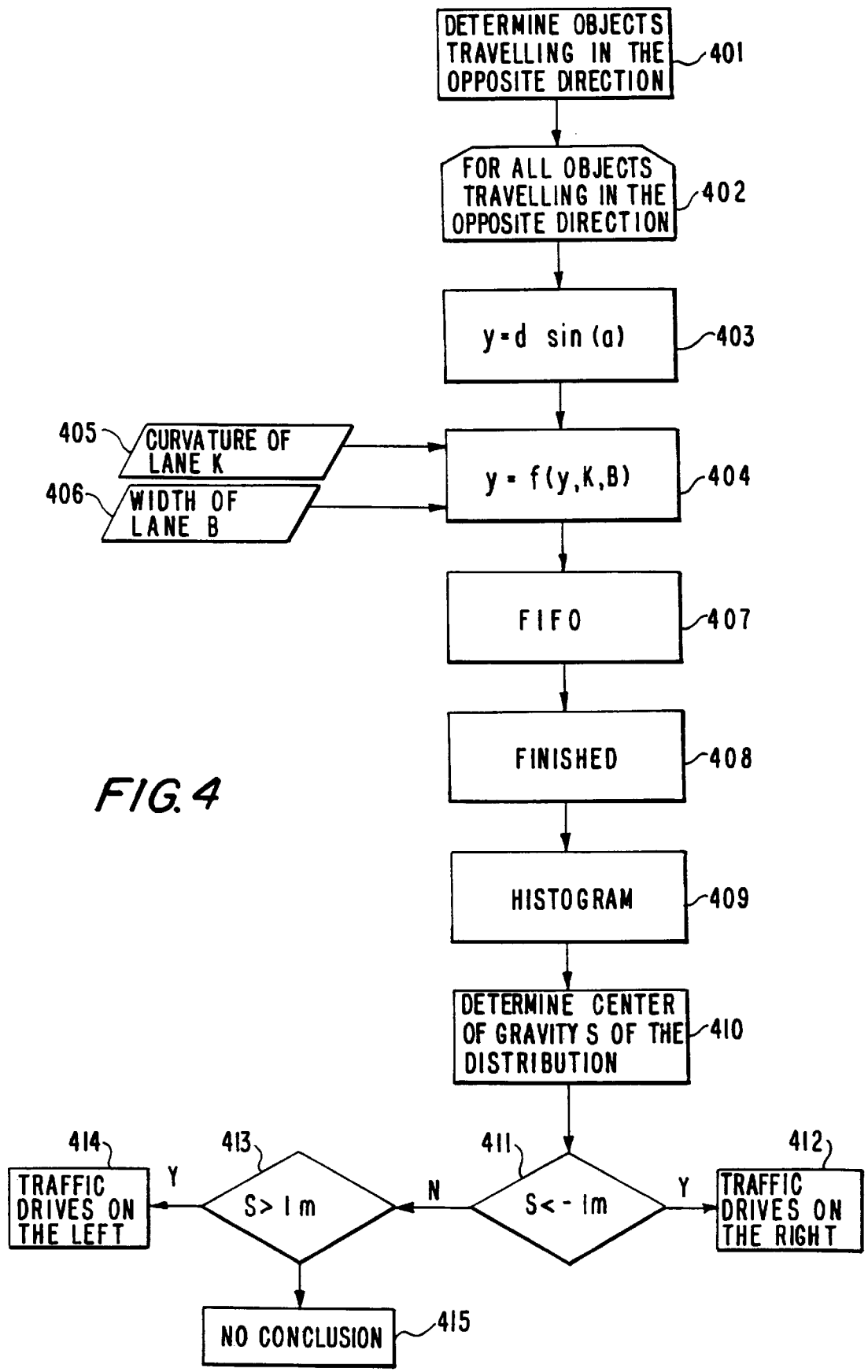

METHOD AND APPARATUS FOR RECOGNIZING WHETHER TRAFFIC DRIVES ON THE RIGHT OR ON THE LEFT

FIELD OF THE INVENTION

The present invention deals with a method and with an apparatus based thereon for recognizing the direction of traffic flow, that is, for recognizing whether, in a traffic situation or in a traffic environment, the vehicles are driving on the right, as they do in many European countries and in the USA, or on the left, as they do in, for example, Great Britain. The method is used within the scope of the adaptive or automatic speed control of a vehicle.

DESCRIPTION OF THE PRIOR ART

An adaptive speed control of a vehicle of this type is described in, for example, DE 42 00 694 A1 (U.S. Pat. No. 5,400,864). A sensor is used to determine the distance from, and the speed of, a preceding vehicle traveling in the same direction, and the speed of the controlled vehicle is adjusted on the basis of this information. Speaking concretely, distance control with respect to a preceding vehicle is superimposed on pure speed control. The essential content of this document is that this distance control is interrupted for a certain period of time in the presence of certain conditions, and that, after this period has expired, the distance control resumes its old function again automatically. This makes it possible, for example, for the driver to start to accelerate early in preparation for a passing maneuver. This document also mentions that the control device can assist a passing maneuver of this kind by accelerating the vehicle automatically. For this purpose, however, the control device must be able to recognize automatically that a passing maneuver is occurring. This can be done, for example, on the basis of the driving direction indicator, but it is also necessary for the controller to know whether passing occurs on the right or on the left. This means in turn that the controller must know whether, in the traffic situation in question, traffic normally travels on the right or on the left.

A method for the adaptive control of the speed of a vehicle is also described in EP0 716 949 A1. The object of this document is the selection of a preceding vehicle as the automatic control target for the distance control, under the assumption that at least two vehicles are available for selection. It is intended that the vehicle not selected can be passed if it is traveling in a slower lane. In contrast, a preceding vehicle which is traveling in a faster lane may not be passed. The decision in this case depends in turn on the laws applicable to the situation and thus ultimately on the knowledge of the prevailing direction of traffic flow in the actual situation. Accordingly, it is already mentioned in this document that the control device must be switched either manually or automatically between two different operating modes as a function of whether, in the situation in question, traffic is driving on the right or on the left. Nevertheless, the document does not describe any way in which switching can occur automatically or any method for recognizing how the direction of traffic flow required for such a switching operation can be determined.

SUMMARY OF THE INVENTION

The goal of the present invention is accordingly to provide a method and an apparatus based thereon for automatically recognizing whether, in a traffic situation or in a traffic environment, traffic travels on the right or on the left.

This task is accomplished in accordance with the invention in that the signals supplied by a distance sensor are analyzed with respect to traffic moving in the opposite direction, which is otherwise usually ignored. Building on these data, a histogram or frequency distribution is created, which states how many vehicles traveling in the opposite direction have been detected, at what lateral distance, and in what lateral direction. Then, the center of gravity of this frequency distribution is found. If this center is to the left of the controlled vehicle, traffic drives on the right; if the center of gravity of the frequency distribution is to the right of the controlled vehicle, traffic drives on the left.

To detect oncoming traffic from the totality of signals being supplied by the distance sensor, it is advantageous to determine a relative velocity between the controlled vehicle and the object which has triggered a distance signal. If this relative velocity is smaller than the negativized intrinsic velocity of the controlled vehicle, the received signal must therefore originate from an oncoming vehicle.

The advantage of this method is, first, that, in contrast to the two devices cited above, the direction of traffic flow can in fact be detected automatically. It is especially advantageous, furthermore, that there is no need for complicated add-ons to the measuring and evaluation devices already present for adaptive speed control.

The automatic detection of the direction of traffic flow ensures that characteristic behaviors of the control device familiar to the driver, such as automatic acceleration for passing, function independently of the prevailing direction of traffic flow. Thus, there is no need for the manufacturer to adjust the control device in the factory or during production to country-specific conditions.

For the driver, on the other hand, the advantage is obtained that, even during a short visit to a country in which the traffic drives on the opposite side from that to which he is accustomed, the controlled vehicle behaves in the same familiar way. Operating safety is increased in comparison with manual switching, furthermore, because unexpected control reactions resulting from mistakes such as forgetting to switch manually from one mode to another cannot occur.

BRIEF DESCRIPTION OF THE DRAWINGS

FIG. 4 shows a flow diagram for implementing the method according to the invention.

DETAILED DESCRIPTION

Figure 1:
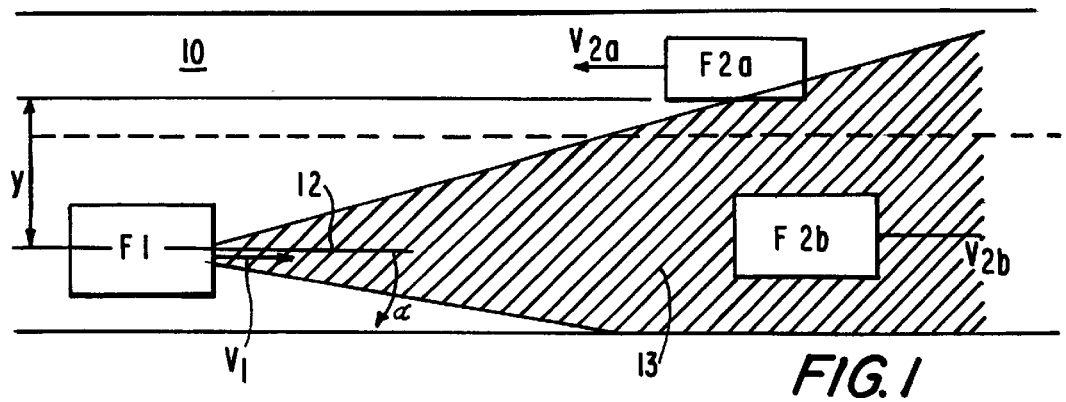
FIG. 1 shows a sketch of a traffic situation to which the method can be applied.

FIG. 1 shows a two-lane road 10, with a vehicle $F_1$ traveling in the right lane. This is an automatically controlled vehicle, that is, a vehicle with adaptive speed control according to the documents cited. It is equipped with an angle-resolving distance and velocity sensor for detecting and evaluating objects which are traveling ahead of it in the same direction. This is realized preferably with the help of a radar or laser sensor. The angular resolution can be achieved by means of, for example, 3-dimensional scanning with a single detection beam or by the use of multi-beam sensors. In addition, a reference axis 12 is shown, and the direction in which an azimuth angle a is measured is also indicated.

Vehicle $F_1$ is traveling at a velocity $v_1$. Ahead of it in the direction of travel is a vehicle $F_1b$, which is traveling in the same direction at a velocity $v_{2b}$. Also ahead of vehicle $F_1$ in the direction of travel, but in the opposite lane, is a vehicle $F_{2a}$, which is traveling at a velocity $v_{2a}$, in the oncoming direction toward vehicle $F_1$. Starting from the front of vehicle $F_1$, two lines, spreading out in the form of a V, bracket an area 13, which symbolizes the detection range of the velocity and distance sensor. Vehicles $F_{1a}$ and $F_{2b}$ are at least partially included within area 13. A variable y denotes a lateral distance between vehicles $F_1$ and $F_{2a}$. Depending on the concrete realization, it can pertain to the longitudinal axes of the vehicles, the sides of the vehicles, or combinations of these.

Figure 2A:
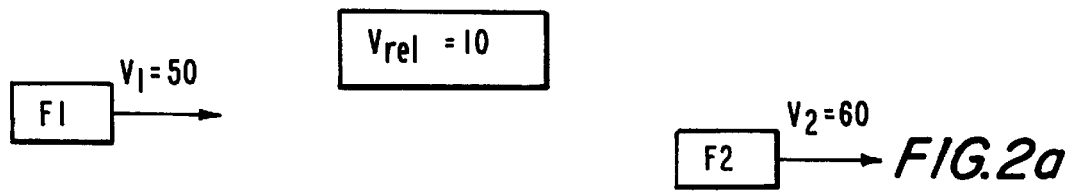
FIG. 2 shows the possible relationships between the velocities of two vehicles according to which their relative speed is evaluated.
Figure 2B:
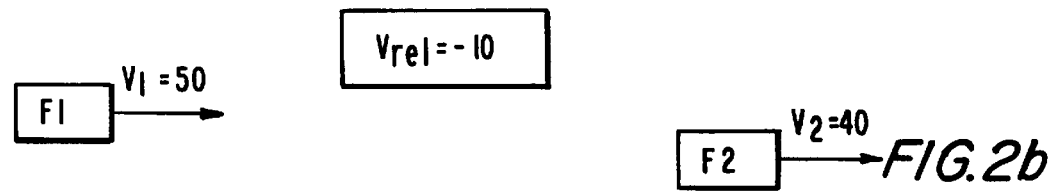
Figure 2C:
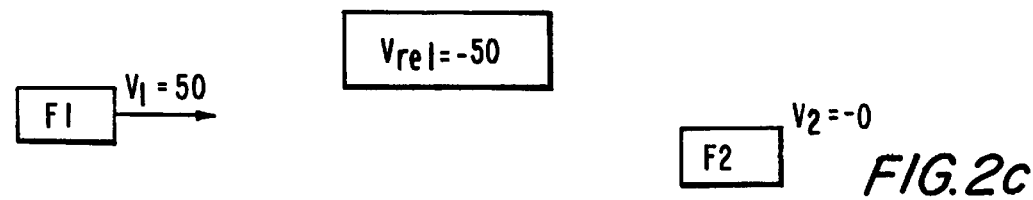
Figure 2D:
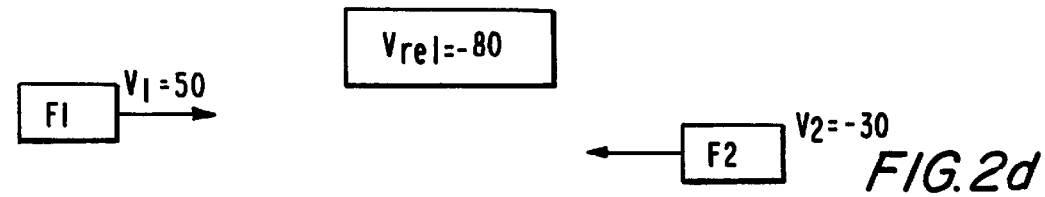
Figure 2E:
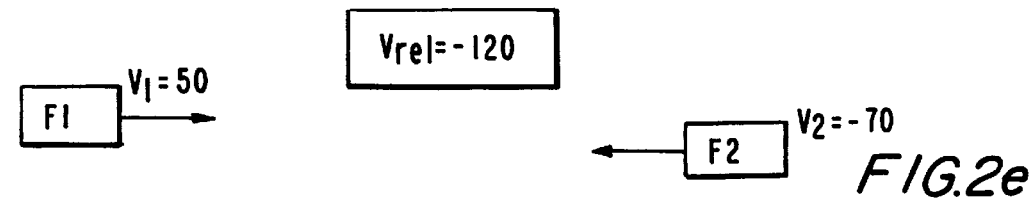

FIGS. 2a–2e each show sketches of a vehicle $F_1$ and a vehicle $F_2$, in which vector arrows indicate the direction of travel. In addition, various velocities $v_1$ and $v_2$ are indicated by way of example. In FIG. 2a, the two vehicles are moving in the same direction, and $v_2$ is greater than $v_1$. In FIG. 2b, the two vehicles are again traveling in the same direction, but here $v_2$ is smaller than $v_1$. In FIG. 2c, vehicle $F_1$ is moving, whereas $F_2$ is standing still; that is, $v_2$ is equal to zero. In FIG. 2d, vehicles $F_1$ and $F_2$ are moving in opposite directions, that is, toward each other. Accordingly, $v_2$ has the opposite sign, that is, a negative sign, and its absolute value in this case is smaller than $v_1$. In FIG. 2e, the two vehicles $F_1$ and $F_2$ are also traveling toward each other, but the absolute value of $v_2$ is now greater than $v_1$, and again it has a negative sign in correspondence with its direction. The resulting relative velocities $v_{rel}$ between the two vehicles $F_1$ and $F_2$ are also indicated in the five sketches. The relative velocity $v_{rel}$ is calculated by finding the difference $v_2-v_1$. $v_{rel}$ has a positive sign when the two vehicles $F_1$ and $F_2$ are traveling away from each other, that is, when the distance between them is increasing. Conversely, a negative sign before the relative velocity characterizes the situation in which the distance between the two vehicles $F_1$ and $F_2$ is decreasing. This corresponds to the physical definition of velocity as the differentiation of a distance with respect to time. A decreasing distance results in a negative differential.

As can also be seen from the five examples sketched in the figures, it is true in general that, when vehicles $F_1$ and $F_2$ are traveling toward each other, the signed relative velocity is smaller than the negativized intrinsic velocity of vehicle $F_1$. The invention takes advantage of this fact to recognize oncoming vehicles on the basis of the signals supplied by the distance and velocity sensor.

Figure 3:
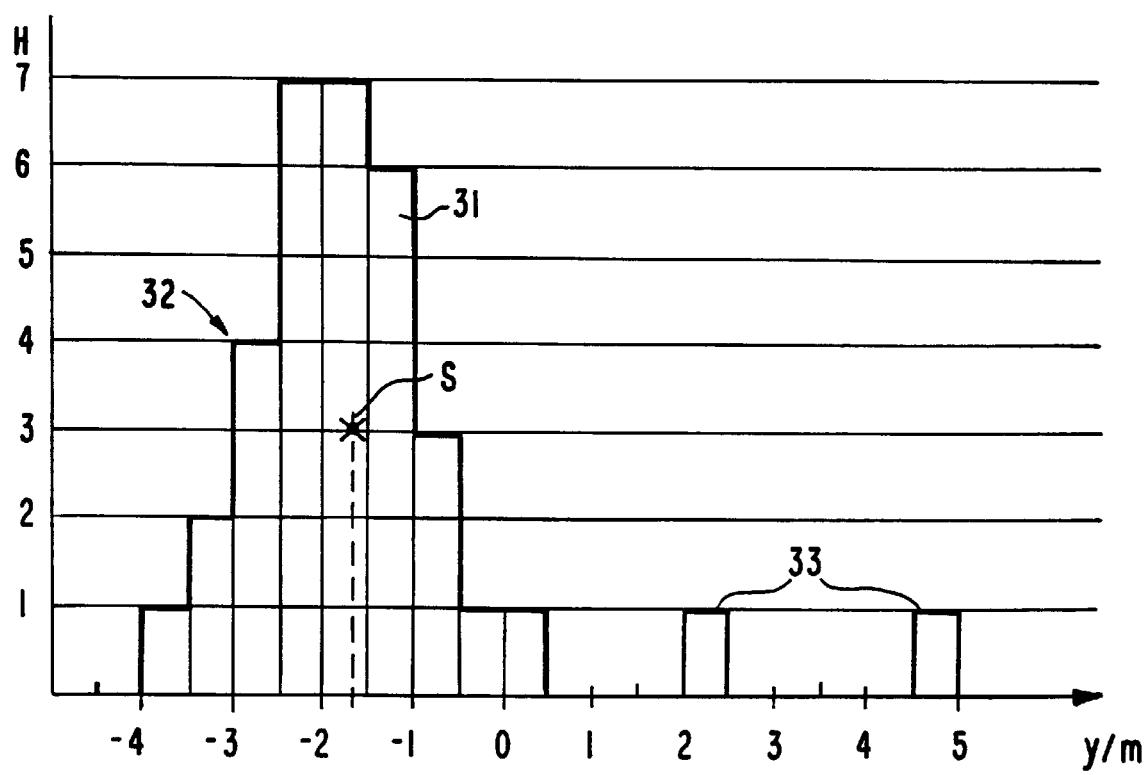
FIG. 3 shows a frequency distribution.

FIG. 3 shows by way of example a graphic frequency distribution of identified oncoming vehicles. The lateral distance y according to FIG. 1 of, for example, −5 to +5 meters is plotted on the abscissa. The ordinate gives the frequency, that is, how often or how many oncoming vehicles have been identified at the associated distances y. To simplify the correlation, it is preferable to form length or distance intervals, which are assumed in this sketch by way of example to be 0.5 meter. Of course, it is also possible to use larger or smaller interval divisions. The numerical values given here have been selected by way of example to provide a concrete illustration.

The individual bars in the graph combine to produce a staircase-like area 31. It can thus be derived from bar 32, for example, that four oncoming vehicles were detected at a lateral distance y of 2.5 to 3 meters.

The lateral distance y is obtained from the data which the distance and velocity sensor supplies as follows:

$$y = d \sin(\alpha)$$

where:

y is the lateral distance to be determined;

d is the distance measured by the sensor; and

α is the angle determined by the sensor at which the vehicle is question has been detected.

Angle α is preferably detected according to FIG. 1 relative to the longitudinal axis of the controlled vehicle $F_1$. Thus, a sign as a directional indication of distance y is obtained from the sine term of the above equation. In the counting direction of the angle selected here according to FIG. 1, a negative sign means that an oncoming vehicle $F_{2a}$ is to the left of controlled vehicle $F_1$. Of course, the method according to the invention can also be realized with a different angle definition and/or different reference values.

S designates the center of gravity of the overall bar graph obtained. This can be determined in the same way as a center of mass of a homogeneous surface by calculations which are generally known from physics. Its position is then evaluated to decide whether traffic drives on the left or on the right. In correspondence with the graph shown by way of example, oncoming vehicles occur primarily with negative values of y. This corresponds in the selected example to the situation shown in FIG. 1, that is, the situation that oncoming vehicles are primarily detected on the left side of the controlled vehicle $F_1$. In addition, however, it is also possible for individual measurement values to occur in other areas of the graph as a result of interference, ambiguities, or measurement errors. This is indicated by way of example by bars 33. These interfering influences are eliminated, however, by the evaluation of the center of gravity and an associated calculation of the average value.

FIG. 4 shows a flow chart for implementing the method according to the invention. In step 401, all opposing-traffic objects are determined on the basis of their relative velocities according to FIG. 2. This means that, out of all the signals supplied by the sensor, those are selected out which apparently originate from an oncoming vehicle. A loop is formed around steps 402 and 408, and the program keeps processing this loop as long as oncoming vehicles are detected. In step 403, the lateral distance y of each oncoming vehicle is determined. This value is calculated on the basis of the measured distance d and the measured angle α. In step 404, which it is preferable to include, a corrected lateral distance y* is determnined. This is no longer related to vehicle $F_1$ but rather to its lane. It is obtained as a function of the previously determined distance y and on the basis of data concerning the curvature K of the lane and its width B. These data are for their part determined in steps 405, 406, for example, on the basis of video processing and sent to calculation step 404. Steps 404–406 correspond to an advantageous further elaboration of the invention, but they are not absolutely necessary.

In step 407, the previously determined distances y or, in correspondence with the advantageous elaboration, the corrected distances y*, are stored in memory. This can be, for example, a FIFO (First In, First Out) memory. The basic idea here is that a certain number of measurement values, such as 1,000, is kept in memory and that, whenever a new measurement value is entered into the memory unit, the oldest value is removed. In this way, the most recent measurements, in this example the 1,000 most recent measurements, can be accessed.

According to step 409, a frequency distribution or a histogram according to FIG. 3 is now created on the basis of all the stored data. In step 410, center of gravity S of the frequency distribution thus obtained is determined. To establish the direction of the traffic flow, the program now checks to see on what side, that is, at which values of y, this center of gravity S is located. For this purpose, step 411, for example, first asks whether or not S is found at values of y of less than 1 meter. If yes, then, according to step 412, the traffic drives on the right. This corresponds to the diagram shown in FIG. 3. If no, step 413 checks to see whether the center of gravity is at values of y which are greater than 1 meter. If this is so, then according to step 414 traffic drives on the left. If this question also receives a "no" answer, then step 415 concludes that a clear-cut answer cannot be given.

The sequence of tests 411 and 413 and the comparison value of 1 meter are again given here merely as examples. Depending on empirical values, the requested or tested comparison value can also be smaller or larger. Similarly, the sequence of tests can also be reversed.

To save storage capacity and computing time, it is possible, as an alternative to having separate steps 407 and 409, for the updating of the stored measurement values with new values and for the calculation of the histogram to be combined into a single step. For this purpose, the histogram is calculated on the basis of the first stored measurement values the first time or each time the system is started up. Every additional, newly obtained measurement value is inserted directly into this existing histogram. Simultaneously, the stored frequencies at the individual distance intervals are lowered by a selected percentage or fraction, so that the grand total of all frequencies always remains the same.

The program can arrive at step 415, that is, fail to arrive at a clear-cut conclusion, when, for example, the number of measurement values available for evaluation is too small. In this case, according to a first embodiment of the invention, the controller assumes a neutral reaction behavior without any right-versus-left decision. This neutral reaction corresponds to an automatic driving speed control which never did have any capacity to decide between right and left.

According to an alternative, second embodiment of the invention, the most recently known state of the system is retained. For this purpose, for example, the data can be stored in or on a nonvolatile storage medium and thus made available for use.

Another embodiment of the invention with a higher level of decision-making certainty is obtained when at least two histograms are supported. A first histogram $H_{fast}$ comprises, for example, all detected vehicles with very high absolute values for the relative velocity; these are usually oncoming vehicles. A second histogram $H_{slow}$ comprises all detected vehicles with a comparatively low relative velocity, that is, primarily vehicles which are traveling in the same direction. If we now define two events A and B as follows:

A=center of gravity S in $H_{fast}$ is at negative values, that is, traffic is probably driving on the right; and B=center of gravity S in $H_{slow}$ is at positive values, that is, traffic is probably driving on the right, then linking the two events logically can lead to a more reliable decision. For example, when both events occur, that is, when it is true that A∩B, where "∩" designates a Boolean "and" linkage, the probability that traffic is driving on the right is high. Conversely, the probability that traffic is driving on the left is high when it is true that (not_A)∩(not_B), where (not_A) and (not_B) are the Boolean negations of events A and B. The absence of a clear-cut decision results when only one of the two defined events occurs, therefore, when, for example, A∩(not_B).

According to another embodiment, priority can be given to event A. Event B, that is, an evaluation of histogram $H_{slow}$ is then used only in cases where a reliable decision cannot be made solely on the basis of histogram $H_{fast}$.

What is claimed is:

1. A method for detecting whether a traffic environment, that is traveled by a first vehicle, is an environment where a right-hand traffic prevails and the drivers are driving on the left side of the car or an environment where a left-hand traffic prevails and the drivers are driving on the right side of the car, said method comprising the steps of:

detecting other oncoming vehicles traveling toward said first vehicle with an angle-resolving distance sensor mounted on said first vehicle; and determining a prevailing direction of traffic flow on the basis of said other vehicles which are traveling toward said first vehicle by analyzing signals supplied by said distance sensor.

2. A method according to claim 1, further comprising the step of recognizing said oncoming vehicle is traveling toward said first vehicle based upon relative velocities between said first vehicle and said oncoming vehicle by analyzing the signs from said distance sensor.

3. A method according to claim 1, further comprising the step of determining lateral distances (y) between the oncoming vehicles and said first vehicle by analyzing the signals from said distance sensor.

4. A method according to claim 3, wherein the lateral distances (y) between said oncoming vehicles and said first vehicle are determined on the basis of a relative position α and a distance d therebetween.

5. A method according to claim 3, further comprising the step of determining corrected lateral distances (y*) from the lateral distances (y) and from data concerning the curvature or width of a lane in which said first vehicle is located.

6. A method according to claim 3, further comprising the step of determining corrected lateral distances (y*) from the lateral distances (y) and data concerning the curvature and width of a lane in which said first vehicle is located.

7. A method according to claim 6, further comprising the step of determining at least one frequency distribution based upon the lateral distance intervals from determined lateral distances (y) or the detenmined corrected lateral distances (y*).

8. A method according to claim 7, wherein lateral distance intervals are formed in order to form said frequency distribution, of which there is at least one.

9. A method according to claim 7, further comprising the step of determining a center of a gravity (S) of said at least one frequency distribution.

10. A method according to claim 9, wherein the step of determining a prevailing direction of traffic flow further comprises a step of determining the position of the center of gravity (S) of said at least one frequency distribution.

11. An apparatus for automatically detecting whether a first vehicle is located in a traffic situation or in a traffic environment is an environment where right-hand traffic prevails and the driver drives on the left-side of the car or is an environment where left-hand traffic prevails and the driver drives on the right side of the car, said apparatus comprising:

a sensor means for detecting objects which are located in an area in the vicinity of the front of the first vehicle;

means for recognizing other oncoming vehicles from among the detected objects upon signals from said sensor means;

said sensor means for detecting the angle of said other oncoming vehicles in respect to said first vehicle;

wherein said sensor means is mounted on said first vehicle; and means for determining a prevailing direction of traffic flow on the basis recognized other oncoming vehicles.

12. An apparatus according to claim 11, and further comprising:

means for determining velocities of said detected objects relative to said first vehicle upon the signals from said sensor means; and means for recognizing said other oncoming vehicles on the basis of the determined relative velocities.

13. An apparatus according to claim 12 and further comprising:

means for determining lateral distances between said other oncoming vehicles traveling toward said first upon the signals from said sensor means; and means for creating at least one frequency distribution on the basis of said distances.

* * * * *

UNITED STATES PATENT AND TRADEMARK OFFICE
CERTIFICATE OF CORRECTION

PATENT NO. : 6,114,973
DATED : Sept. 5, 2000
INVENTOR(S) : Winner et al.

It is certified that error appears in the above-identified patent and that said Letters Patent is hereby corrected as shown below:

In column 2, line 64, change "a" to -- α --.
In column 6, line 24, change "sensor" to -- sensors --.
In column 6, line 35, before "data" insert -- from --.
In column 6, line 35, change the last "and" to -- or --.
In column 6, line 62-63, delete -- upon signals from said sensor means --.
In column 6, line 65, after "vehicle" delete -- ; --.
In column 8, line 5, after "first" insert -- vehicle --.

Signed and Sealed this

Twenty-fourth Day of April, 2001

Attest:

NICHOLAS P. GODICI

Attesting Officer

Acting Director of the United States Patent and Trademark Office